US007293757B2

(12) United States Patent
Akabane

(10) Patent No.: US 7,293,757 B2
(45) Date of Patent: Nov. 13, 2007

(54) ELECTROMAGNETIC FUEL INJECTION VALVE

(75) Inventor: Akira Akabane, Kakuda (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 11/234,381

(22) Filed: Sep. 26, 2005

(65) Prior Publication Data

US 2006/0214032 A1 Sep. 28, 2006

(30) Foreign Application Priority Data

Sep. 27, 2004 (JP) ............................ 2004-279697

(51) Int. Cl.
*F16K 31/02* (2006.01)

(52) U.S. Cl. ............................. 251/129.21; 239/585.5

(58) Field of Classification Search ........... 251/129.15, 251/129.21; 239/585.1, 585.2, 585.3, 585.4, 239/585.5; 335/299

See application file for complete search history.

(56) References Cited

U.S. PATENT DOCUMENTS

| | | | | |
|---|---|---|---|---|
| 3,451,021 | A * | 6/1969 | Atherton | 335/260 |
| 4,720,078 | A * | 1/1988 | Nakamura et al. | 251/129.15 |
| 4,944,486 | A | 7/1990 | Babitzka | |
| 5,494,224 | A * | 2/1996 | Hall et al. | 239/585.5 |
| 6,131,880 | A * | 10/2000 | Hahn et al. | 251/129.16 |
| 6,382,532 | B1 * | 5/2002 | French et al. | 238/585.1 |
| 6,869,032 | B2 * | 3/2005 | Maier et al. | 239/533.13 |
| 7,097,151 | B2 * | 8/2006 | Akabane | 251/129.18 |

FOREIGN PATENT DOCUMENTS

| | | | |
|---|---|---|---|
| JP | 57-143454 | U | 9/1982 |
| JP | 58-111903 | U | 7/1983 |
| JP | 60-194309 | | 12/1985 |
| JP | 61-165082 | A | 7/1986 |
| JP | 6-26418 | | 2/1994 |
| JP | 2000-170620 | A | 6/2000 |
| JP | 2002-353026 | A | 12/2002 |
| JP | 2004-76700 | | 3/2004 |

* cited by examiner

*Primary Examiner*—Eric Keasel
*Assistant Examiner*—John K. Fristoe, Jr.
(74) *Attorney, Agent, or Firm*—Arent Fox LLP

(57) ABSTRACT

An electromagnetic fuel injection valve has a rear end of a magnetic body coaxially connected to a front portion of a fixed core via a non-magnetic body. A coil assembly surrounds a rear portion of the magnetic body and the fixed core. A bobbin includes a cylindrical portion; a pair of flanges protruding radially outward from opposite ends of the cylindrical portion; and a terminal boss portion protruding sideways from one of the flanges disposed at a side opposite from the magnetic body and to which a pair of power-receiving-side connecting terminals are fixed. Engagement recesses are recessed inward on opposite sides of the terminal boss portion connected to the one flange wherein intermediate portions of a pair of coil ends extending from opposite ends of a coil pass through and engage the engagement recesses and are electrodeposited to a pair of electrodeposition portions provided with the connecting terminals.

3 Claims, 6 Drawing Sheets

ELECTROMAGNETIC FUEL INJECTION VALVE

BACKGROUND OF THE INVENTION

1. Field of the Invention

The present invention relates to an electromagnetic fuel injection valve, and particularly to an electromagnetic fuel injection valve in which a rear end of a magnetic cylindrical body is coaxially connected to a front portion of a cylindrical fixed core via a non-magnetic cylindrical body; a movable core of which rear end is opposed to a front end of the fixed core is coaxially connected to a valve body which is capable of being seated on a valve seat provided at a valve seat member coaxially connected to a front end of the magnetic cylindrical body and which is biased to a side to be seated on the valve seat; and a coil assembly formed by winding a coil around a bobbin is disposed to surround a rear portion of the magnetic cylindrical body and the fixed core.

2. Description of the Related Art

In recent years, such an electromagnetic fuel injection valve is used for a motor-assisted bicycle, so that the need for downsizing the electromagnetic fuel injection valve is increasing. For example, Japanese Utility Model Application Laid-open No. 60-194309 and Japanese Patent Application Laid-open No. 6-26418 disclose a terminal holder for fixing a power-receiving-side connecting terminal to be connected to a coil of a coil assembly extends along an axial direction from a bobbin at a fixed core side, but in such a structure of the terminal holder, it is difficult to shorten the length in the axial direction of the electromagnetic fuel injection valve.

Besides, when the coil ends extending from opposite ends of the coil are electrodeposited to the electrodeposition portions of power-receiving-side connecting terminals, it is necessary to keep the intermediate portions of the coil ends tight so that looseness does not occur at the coil side. In the electromagnetic fuel injection valve disclosed in the above-described Japanese Patent Application Laid-open No. 6-26418, a projecting portion for engaging the intermediate portion of the coil end is provided so as to project sideward from a bobbin, but the bobbin increases in size due to such a projecting portion, whereby the electromagnetic fuel injection valve also increases in size.

SUMMARY OF THE INVENTION

The present invention has been achieved in view of the above-mentioned circumstances, and has an object to provide an electromagnetic fuel injection valve which can be downsized.

To achieve the above object, according to a first feature of the present invention, there is provided an electromagnetic fuel injection valve in which a rear end of a magnetic cylindrical body is coaxially connected to a front portion of a cylindrical fixed core via a non-magnetic cylindrical body; a movable core of which rear end is opposed to a front end of the fixed core is coaxially connected to a valve body which is capable of being seated on a valve seat provided at a valve seat member coaxially connected to a front end of the magnetic cylindrical body and which is biased to a side to be seated on the valve seat; and a coil assembly formed by winding a coil around a bobbin is disposed to surround a rear portion of the magnetic cylindrical body and the fixed core, characterized in that the bobbin integrally includes: a cylindrical portion which surrounds the rear portion of the magnetic cylindrical body and the fixed core; a pair of flange portions which protrude radially outward from opposite ends of the cylindrical portion so as to define opposite ends of the coil that is wound around an outer periphery of the cylindrical portion; and a terminal boss portion which protrudes sideway from one of the flange portions that is disposed at a side opposite from the magnetic cylindrical body and to which a pair of power-receiving-side connecting terminals are fixed, and that engagement recesses are respectively formed to be recessed inward on opposite sides of a portion of the terminal boss portion connected to the one flange portion so that intermediate portions of a pair of coil ends extending from opposite ends of the coil are passed through and engaged with the engagement recesses and are electrodeposited respectively to a pair of electrodeposition portions provided at both the power-receiving-side connecting terminals.

With this arrangement, the terminal boss portion provided at one end portion of the bobbin at the side opposite from the magnetic cylindrical body protrudes sideward, and therefore the coil assembly is shortened in the axial direction, which can contribute to reduction in the entire length in the axial direction of the electromagnetic fuel injection valve. In addition, the engagement recesses are respectively formed to be recessed inward at opposite sides of the connecting portion between the flange portion of the one end portion of the bobbin and the terminal boss portion so that the intermediate portions of a pair of coil ends extending from opposite ends of the coil are passed through and engaged with the engagement recesses. Therefore, the intermediate portion of the coil end can be kept tight so that looseness does not occur at the coil side, while it is made unnecessary to provide a projecting portion on the bobbin so as to project sideward to engage the intermediate portion of the coil end. Thus, the bobbin can be downsized, whereby the electromagnetic fuel injection valve can be also downsized.

According to a second feature of the present invention, in addition to the first feature, the pair of guide grooves which connect the pair of electrodeposition portions and the pair of engagement recesses are provided at the terminal boss portion so as to allow both the coil ends to pass through the pair of guide grooves. With this arrangement, it becomes possible to enhance the connecting operation efficiency of the coil by guiding the coil ends toward the electrodeposition portions through the guide grooves, and possibility of occurrence of wire breakage can be lowered as much as possible by embedding the coil ends in the terminal boss portion.

According to a third feature of the present invention, in addition to the second feature, a portion of one end of the guide groove connected to the engagement recess is formed to be smoothly curved. With this arrangement, possibility of wire breakage can be further lowered by preventing the coil end from being caught on a portion at which the coil end is bent toward the guide groove from the engagement recess.

The above-mentioned object, other objects, features and advantages of the present invention will become apparent from a preferred embodiment, which will be described in detail below by reference to the attached drawings.

BRIEF DESCRIPTION OF THE DRAWINGS

FIG. 1 is a longitudinal sectional view of an electromagnetic fuel injection valve.

FIG. 2 is a partially cutaway enlarged side view of a coil assembly.

FIG. 3 is a view taken from the arrow 3 in FIG. 2.

FIG. 4 is a view taken from the arrow 4 in FIG. 2.

FIG. 5 is a view corresponding to FIG. 2 in a state immediately before electrodeposition of a coil end to a power-receiving-side connecting terminal.

FIG. 6 is a view taken from the arrow 6 in FIG. 5.

DESCRIPTION OF THE PREFERRED EMBODIMENTS

Figure 1:
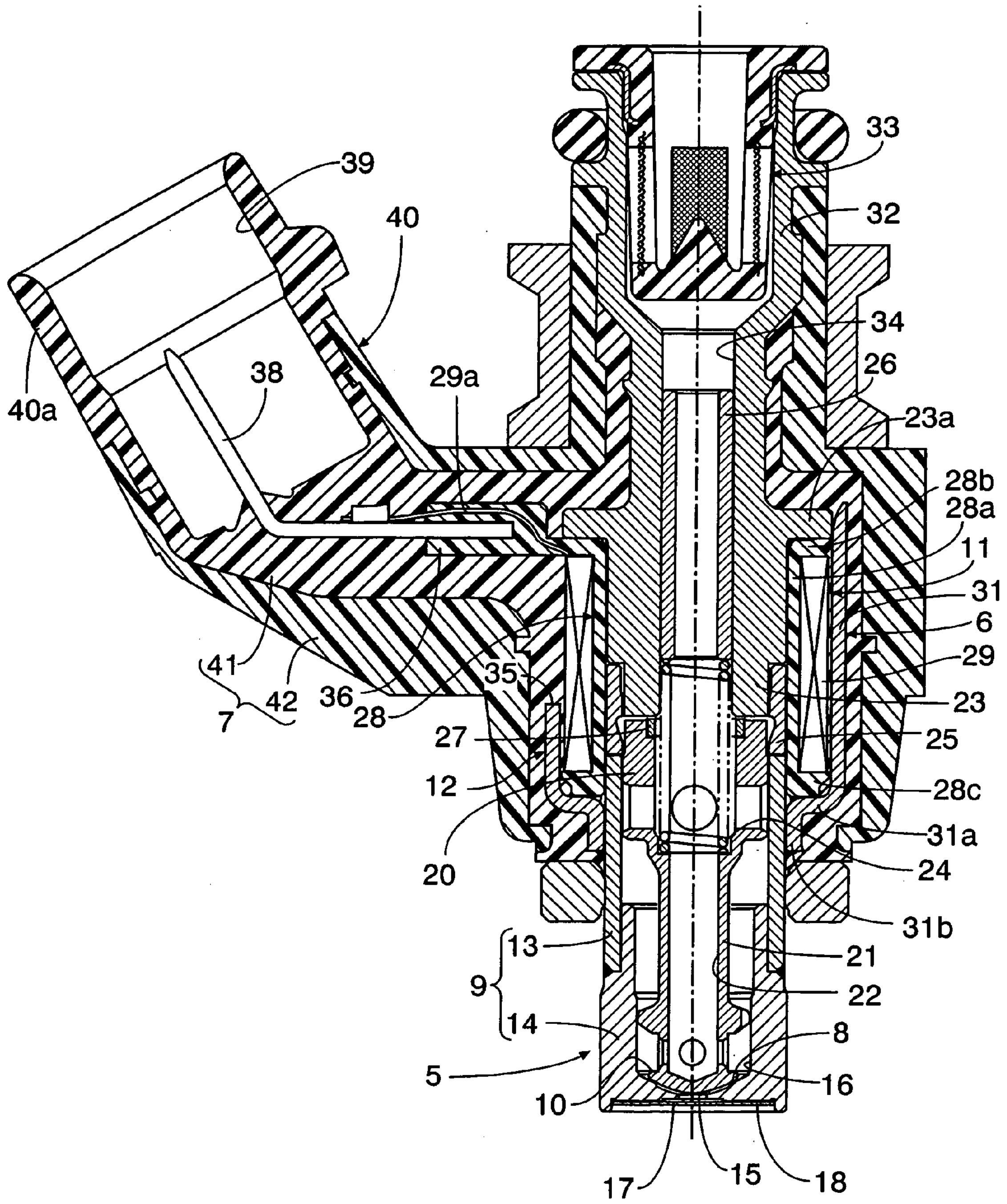
FIGS. 1 to 6 show one embodiment of the present invention.

One embodiment of the present invention will be described with reference to FIGS. 1 to 6. Referring first to FIG. 1, an electromagnetic fuel injection valve for injecting a fuel into an engine (not shown) includes: a valve operating part 5 in which a valve body 10 that is biased by a spring in a direction to be seated on a valve seat 8 is housed in a valve housing 9 having the valve seat 8 at a front end; a solenoid part 6 in which a coil assembly 11 capable of exhibiting an electromagnetic force for driving the valve body 10 to a side away from the valve seat 8 is housed in a solenoid housing 12 connected to the valve housing 9; a resin molded part 7 made of a synthetic resin, which integrally has a power receiving coupler 40 facing power-receiving-side connecting terminals 38 connected to the coil 29 of the coil assembly 11 and in which at least the coil assembly 11 and the solenoid housing 12 are embedded and sealed.

The valve housing 9 comprises a magnetic cylindrical body 13 made of magnetic metal, and a valve seat member 14 which is fluid-tightly connected to a front end of the magnetic cylindrical body 13. The valve seat member 14 is welded to the magnetic cylindrical body 13 with its rear end portion fitted to a front end portion of the magnetic cylindrical body 13. The valve seat member 14 is coaxially provided with a fuel outlet port 15 opened to a front end surface of the valve seat member 14, the tapered valve seat 8 connected to an inner end of the fuel outlet port 15, and a guide hole 16 connected to a rear end large diameter portion of the valve seat 8. An injector plate 18 of a steel plate having a plurality of fuel injection holes 17 communicating with the fuel outlet port 15 is fluid-tightly welded to a front end of the valve seat member 14 along its entire periphery.

A movable core 20 constituting a part of the solenoid part 6 is slidably fitted to a rear portion within the valve housing 9. The valve body 10 capable of closing the fuel outlet port 15 by sitting on the valve seat 8 is integrally formed at a front end of a valve shaft 21 integrally connecting to the movable core 20. A through-hole 22 formed into a bottomed shape with its front end closed and leading into the valve housing 9 is formed coaxially in the movable core 20, the valve shaft 21 and the valve body 10.

The solenoid part 6 includes: the movable core 20; a cylindrical fixed core 23 opposed to the movable core 20; a return spring 24 which exhibits a spring force biasing the movable core 20 to a side away from the fixed core 23; the coil assembly 11 which is disposed to surround the rear portion of the valve housing 9 and the fixed core 23 while being capable of exhibiting the electromagnetic force which attracts the movable core 20 toward the fixed core 23 against the spring force of the return spring 24; and the solenoid housing 12 which encloses the coil assembly 11 so that its front end portion is connected to the valve housing 9.

A rear end of the magnetic cylindrical body 13 in the valve housing 9 is coaxially connected to a front end of the fixed core 23 via a non-magnetic cylindrical body 25 made of non-magnetic metal such as stainless steel. The rear end of the magnetic cylindrical body 13 is butt-welded to a front end of the non-magnetic cylindrical body 25. A rear end of the non-magnetic cylindrical body 25 is welded to the fixed core 23 with the front end portion of the fixed core 23 fitted to the non-magnetic cylindrical body 25.

A cylindrical retainer 26 is fitted to the fixed core 23 and fixed by crimping. The return spring 24 is interposed between the retainer 26 and the movable core 20. In order to avoid the movable core 20 from directly contacting the fixed core 23, a ring-shaped stopper 27 made of a non-magnetic material is fitted and fixed to an inner periphery of the rear end portion of the movable core 20 so as to slightly project toward the fixed core 23 from the rear end surface of the movable core 20. Further, the coil assembly 11 is formed by winding a coil 29 around a bobbin 28 which surrounds the rear portion of the valve housing 9, the non-magnetic cylindrical body 25 and the fixed core 23.

The solenoid housing 12 comprises a cylindrical coil case 31 made of magnetic metal and a flange portion **23*a*. The cylindrical coil case 31 has, at its one end, an annular end wall 31*a* and surrounds the coil assembly 11, and the flange portion 23*a* protruding radially outward from the rear end portion of the fixed core 23 to oppose the end portion of the coil assembly 11 at a side opposite from the valve operating part 5. The flange portion 23*a* is magnetically connected to the other end portion of the coil case 31. In addition, a fitting cylindrical portion 31*b* to which the magnetic cylindrical body 13 in the valve housing 9 is fitted is coaxially provided at an inner periphery of the end wall 31*a* in the coil case 31. The solenoid housing 12 is connected to the valve housing 9 by fitting the valve housing 9 into the fitting cylindrical portion 31*b***.

A cylindrical inlet cylinder 32 is integrally and coaxially connected to the rear end of the fixed core 23. A fuel filter 33 is mounted to a rear portion of the inlet cylinder 32. A fuel passage 34 communicating with the through-hole 21 of the movable core 20 is coaxially provided in the inlet cylinder 32, the retainer 26 and the fixed core 23.

The resin molded part 7 is formed so as to sealingly imbed therein not only the solenoid housing 12 and the coil assembly 11 but also a part of the valve housing 9 and most part of the inlet cylinder 32, while filling a gap between the solenoid housing 12 and the coil assembly 11. The coil case 31 of the solenoid housing 12 is provided with a notched portion 35 for disposing a terminal boss portion 36, which is integrally formed at the bobbin 28 of the coil assembly 11, at an outside of the solenoid housing 12.

The resin molded part 7 is integrally provided with the power receiving coupler 40 forming a recessed portion 39 which faces the power-receiving-side connecting terminals 38 connecting to opposite ends of the coil 29 in the coil assembly 11. Base ends of the power-receiving-side connecting terminals 38 are imbedded in the terminal boss portion 36. Coil ends **29*a* of the coil 29 are electrodeposited to the power-receiving-side connecting terminals 38**.

The resin molded part 7 is formed by molding two layers, that is, a first resin molded layer 41 which covers at least a part of the solenoid housing 12 and forms a coupler main portion **40*a* forming a basic structure of the power receiving coupler 40, and a second resin molded layer 42 which covers the first resin molded layer 41 so that an outer periphery of the power receiving coupler 40 is exposed from an intermediate portion to a tip end side of the power receiving coupler 40. In this embodiment, the entire part of the solenoid housing 12, the rear part of the valve housing 9 and a part of the inlet cylinder 32 are covered with the first resin molded layer 41, and the coupler main portion 40*a* of the power receiving coupler 40 is formed by the first resin molded layer 41**.

In addition, the first and the second resin molded layers 41 and 42 are made of different synthetic resins. While the first resin molded layer 41 is made of a synthetic resin having a relatively large bending strength, the second resin molded layer 42 is made of a synthetic resin with a bending strength smaller than that of the first resin molded layer 41. The first resin molded layer 41 is made of, for example, a liquid crystal polymer containing glass fiber. The second resin molded layer 42 is made of a thermoplastic polyester elastomer excluding glass fiber, for example, an elastomer under the trade name of Hytrel (produced by Du Pont de Nemours & Company Inc.).

The liquid crystal polymer containing glass fiber which forms the first resin molded layer 41 has a high rigidity and a function of relatively suppressing transmission of operation sound. On the other hand, the second resin molded layer 41 is made of the thermoplastic polyester elastomer excluding glass fiber can suppress the operation sound pressure peak to be low.

Figure 2:
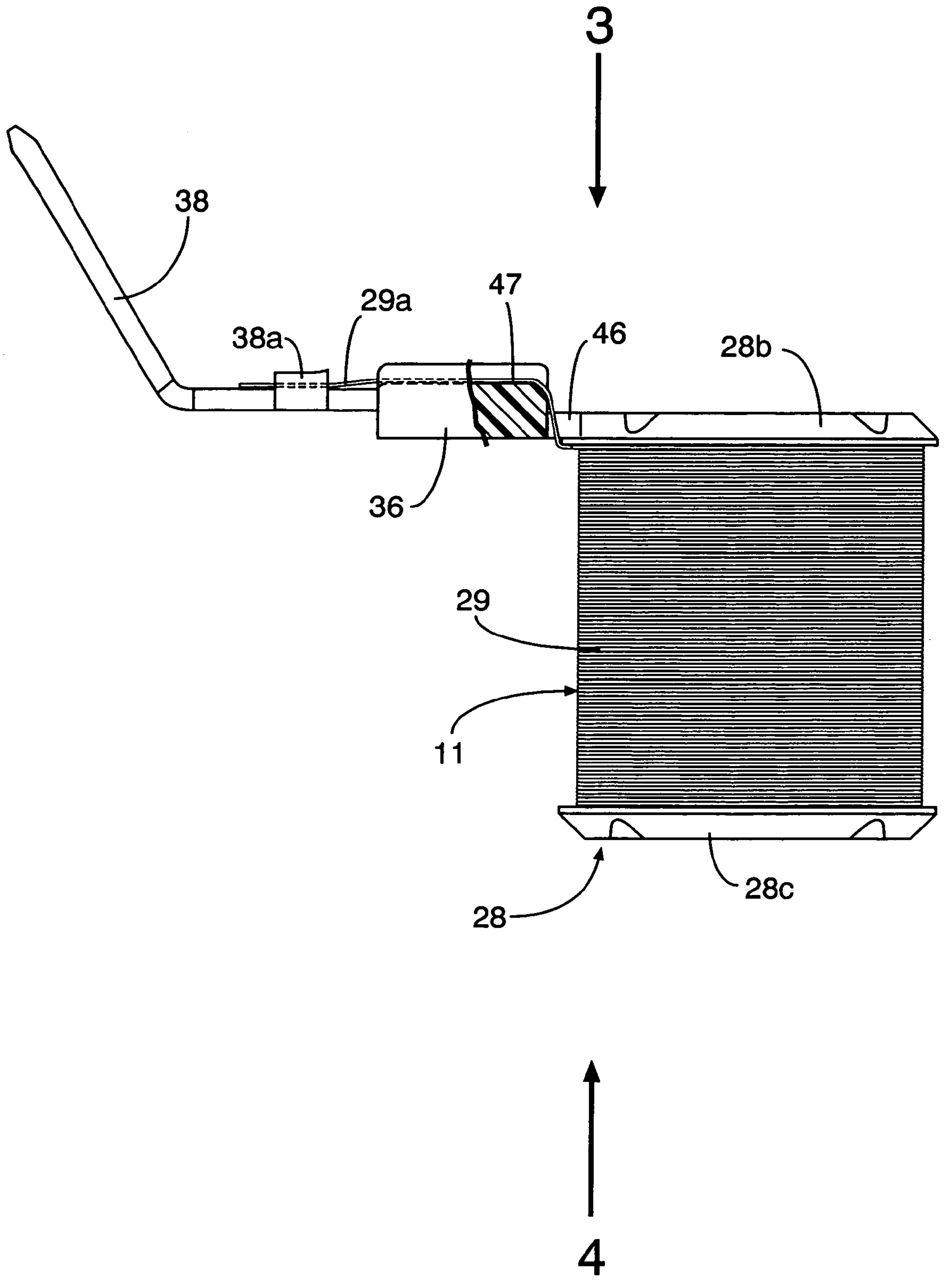
Figure 3:
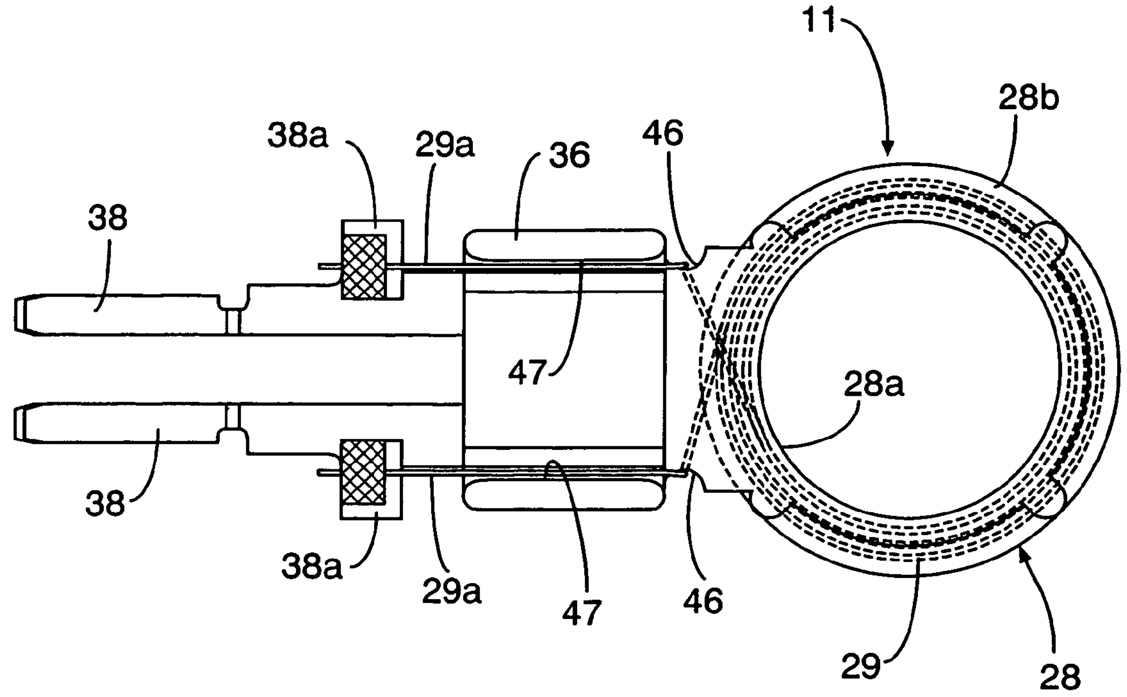
Figure 4:
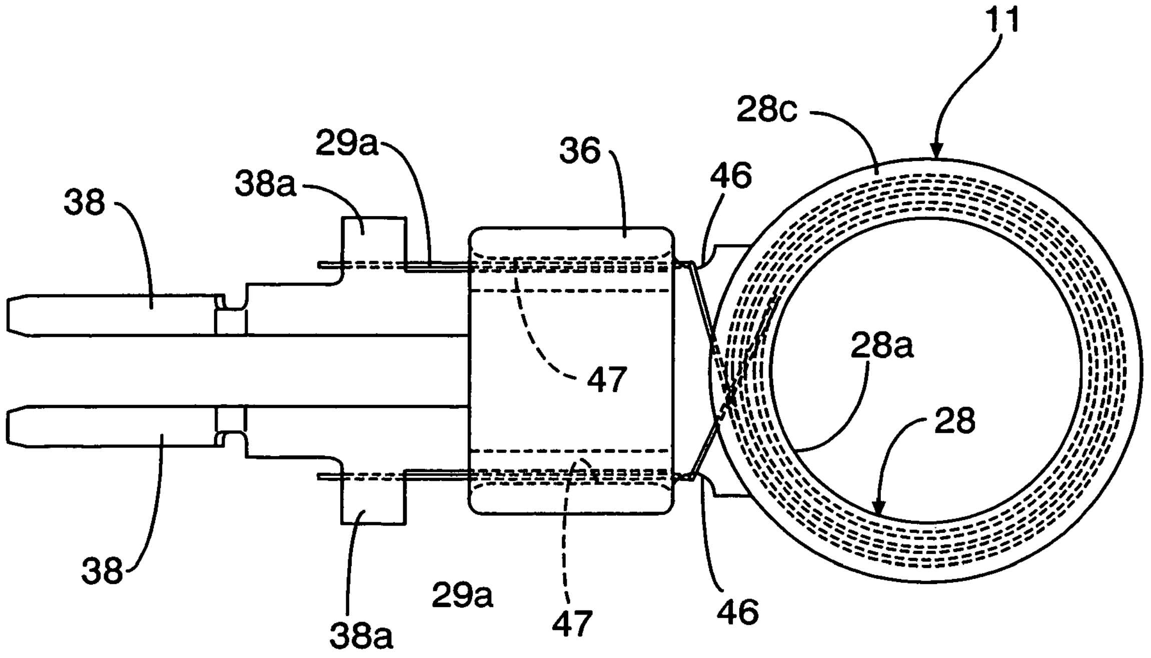

Referring to FIGS. 2 to 4 together, the bobbin 28 of the coil assembly 11 integrally includes: a cylindrical portion 28*a* which surrounds the rear portion of the magnetic cylindrical body 13 and the fixed core 23; a pair of flange portions 28*b* and 28*c* which protrude radially outward from opposite ends of the cylindrical portion 28*a* so as to define opposite ends of the coil 29 wound around an outer periphery of the cylindrical portion 28*a*; and the terminal boss portion 36 which protrudes sideward from one 28*b* of the flange portions 28*b* and 28*c* that is disposed at an opposite side from the magnetic cylindrical body 23. A pair of power-receiving-side connecting terminals 38 facing the inside of the power receiving coupler 40 are fixed to the terminal boss portion 36 by press-fitting the base end portions of the power-receiving-side connecting terminals 38 and embedding them in the terminal boss portion 36. Intermediate portions of both the power-receiving-side connecting terminals 38 are bent so that their tip end portions are inclined diagonally corresponding to the shape of the power receiving coupler 40.

Engaging recessed portions 46 and 46 are respectively formed to be recessed inward at opposite sides of a portion of the terminal boss portion 36 connected to the one flange portion 28*b* so that intermediate portions of a pair of coil ends 29*a* and 29*a* extending from opposite ends of the coil 29 are passed through and engaged with the engagement recesses 46 and 46 and are respectively electrodeposited on a pair of electrodeposition portions 38*a* provided at both the power-receiving-side connecting terminals 38.

The terminal boss portion 36 is provided with a pair of guide grooves 47 and 47 which connect the pair of electrodeposition portions 38*a* and the pair of engagement recesses 46 so that both the coil ends 29*a* are passed through a pair of the guide grooves 47 and 47.

Further, connecting portions at one ends of the guide grooves 47 to the engagement recesses 46 are formed to be smoothly curved as shown in FIG. 2.

Figure 5:
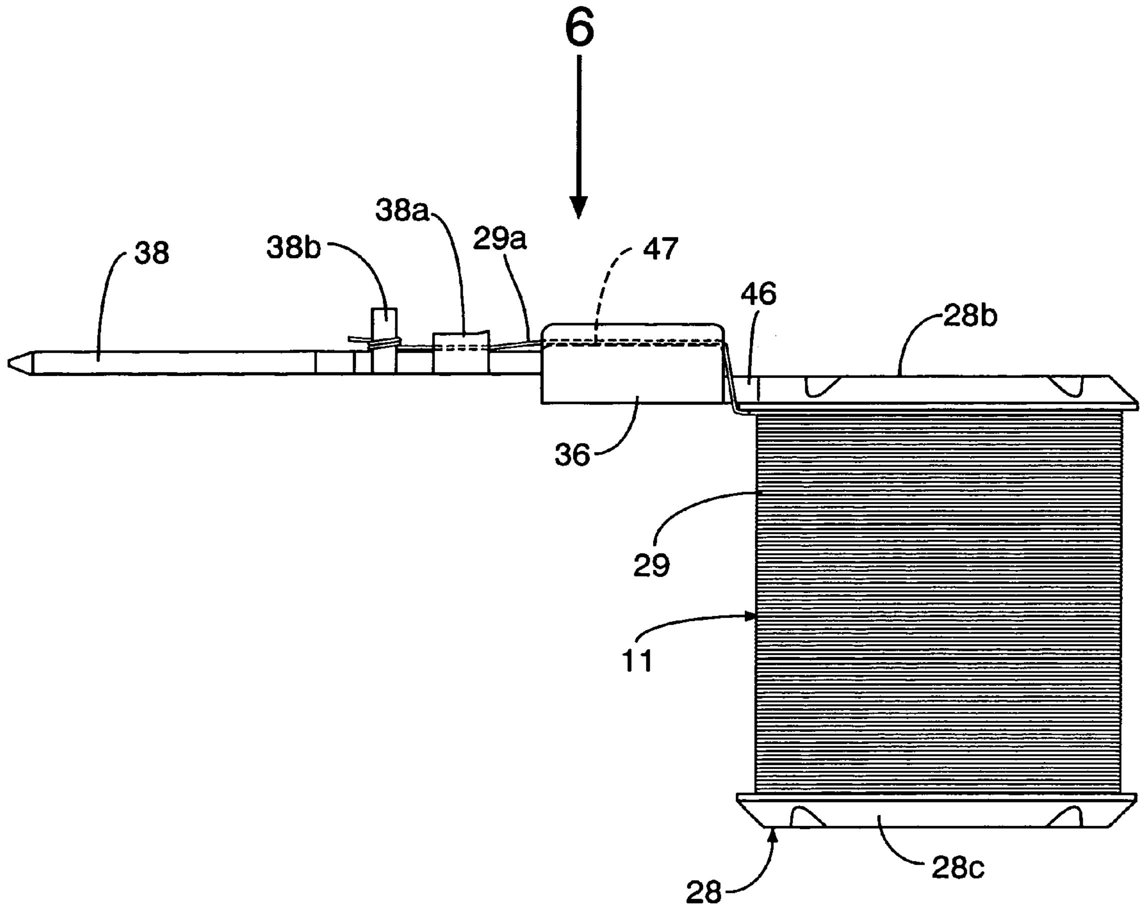
Figure 6:
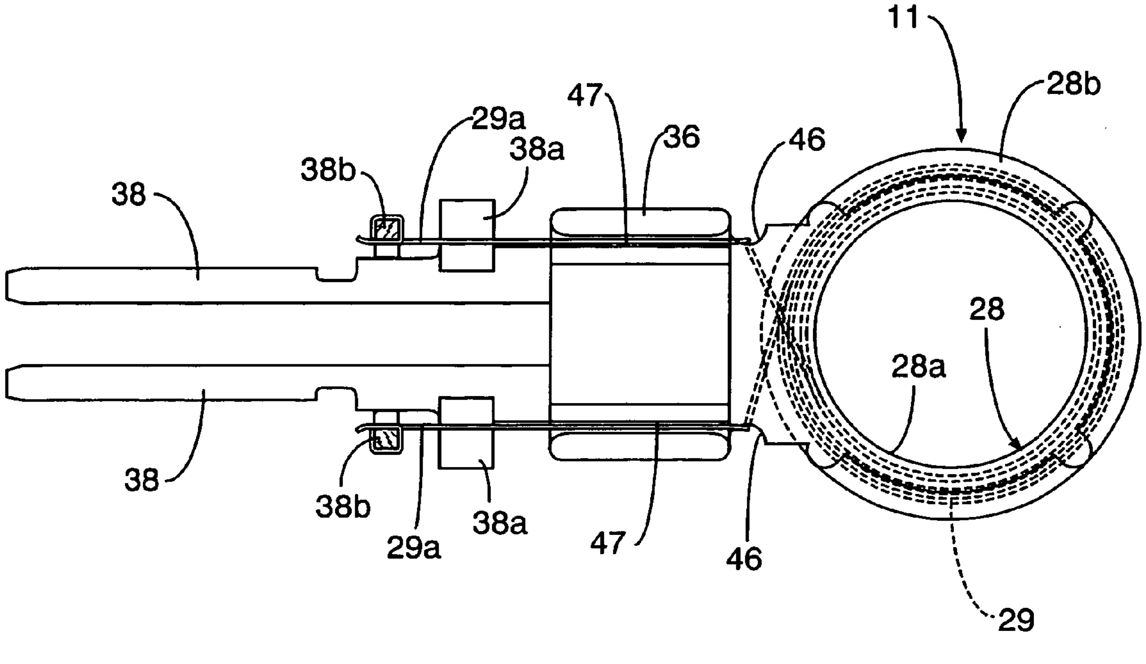

An operation of electrodepositing the coil ends 29*a* at opposite ends of the coil 29 to both the power-receiving-side connecting terminals 38 is performed as follows: disposable boss portions 38*b* and 38*b* capable of being cut are provided in advance on the power-receiving-side connecting terminals 38 at a side opposite from the bobbin 28 with respect to the electrodeposition portions 38*a*, as shown in FIGS. 5 and 6; both the coil ends 29*a* extending from the coil 29 wound around the bobbin 28 are pulled up to the disposable boss portions 38*b* through the guide grooves 47 and the electrodeposition portions 38*a*, while the intermediate portions of the coil ends 29*a* are engaged with the engagement recesses 46; the intermediate portions of the coil ends 29*a* are electrodeposited to the electrodeposition portions 38*a*, while the coil ends 29*a* are wound around the disposable boss portions 38*b* to impart tension to the coil ends 29*a*; and the disposable boss portions 38*b* and unnecessary portions of the coil ends 29*a* are cut off to complete this electrically connecting operation.

Next, an operation of the embodiment will be described. The bobbin 28 of the coil assembly 11 integrally includes: a cylindrical portion 28*a* which surrounds the rear portion of the magnetic cylindrical body 13 and the fixed core 23; a pair of flange portions 28*b* and 28*c* which protrude radially outward from opposite ends of the cylindrical portion 28*a* so as to define opposite ends of the coil 29 which is wound around an outer periphery of the cylindrical portion 28*a*; and the terminal boss portion 36 which protrudes sideward from one 28*b* of the flange portions 28*b* and 28*c* that is disposed at a side opposite from the magnetic cylindrical body 13, and to which a pair of the power-receiving-side connecting terminals 38 are fixed.

Namely, since the terminal boss portion 28*b* provided at one end portion of the bobbin 28 protrudes sideway at a side opposite from the magnetic cylindrical body 13, the coil assembly 11 is shortened in the axial direction, which contributes reduction in the entire length in the axial direction of the electromagnetic fuel injection valve.

The engagement recesses 46 and 46 are respectively formed to be recessed inward at opposite sides of a portion of the terminal boss portion 36 connected to the one flange portion 28*b* so that intermediate portions of a pair of coil ends 29*a* and 29*a* extending from opposite ends of the coil 29 are passed through and engaged with the engagement recesses 46 and 46 and are respectively electrodeposited on a pair of electrodeposition portions 38*a* provided at both the power-receiving-side connecting terminals 38. Therefore, the intermediate portion of the coil end 29*a* can be kept tight so that looseness does not occur at the coil 29 side, while it is made unnecessary to provide a projecting portion on the bobbin 28 so as to project sideward to engage the intermediate portion of the coil end 29*a*. Thus, the bobbin can be downsized, whereby the electromagnetic fuel injection valve can be also downsized.

Since the terminal boss portion 36 is provided with a pair of guide grooves 47 which connect the pair of electrodeposition portions 38*a* and the pair of engagement recesses 46 so that both the coil ends 29*a* pass through the pair of guide grooves 47, it is possible to enhance connecting operation efficiency of the coil 29 by guiding the coil ends 29*a* to the electrodeposition portions 38*a* through the guide grooves 47, and further possibility of occurrence of wire breakage is made as low as possible by imbedding the coil ends 29*a* in the terminal boss portion 36.

Further, connecting portions of one ends of the guide grooves 47 to the engagement recesses 46 are formed to be smoothly curved, whereby possibility of wire breakage can be made further lower by keeping the coil ends 29*a* from being caught on portions at which the coil ends 29*a* are bent to the guide grooves 47 from the engagement recesses 46.

The embodiment of the present invention is described thus far, but the present invention is not limited to the above described embodiment, and various design changes can be made without departing from the present invention described in the claims.

What is claimed is:

1. An electromagnetic fuel injection valve comprising:

a rear end of a magnetic body coaxially connected to a front portion of a fixed core via a non-magnetic body;

a movable core having a rear end opposing a front end of the fixed core and which is coaxially connected to a valve body that is capable of being seated on a valve seat provided at a valve seat member coaxially connected to a front end of the magnetic body and which is biased to a side to be seated on the valve seat; and a coil assembly including a coil wound around a bobbin, wherein the coil assembly encompasses a rear portion of the magnetic body and the fixed core, wherein the bobbin includes:

a cylindrical portion encompassing the rear portion of the magnetic body and the fixed core;

a pair of flanges protruding radially outward from opposite ends of the cylindrical portion and defining opposite ends of the coil that is wound around an outer periphery of the cylindrical portion; and a terminal boss portion protruding sideways from one of the flanges that is disposed at a side opposite from the magnetic body and to which a pair of power-receiving-side connecting terminals are fixed, and wherein engagement recesses are formed to be recessed inward on opposite sides of a portion of the terminal boss portion connected to the one flange so that intermediate portions of a pair of coil ends extending from opposite ends of the coil are passed through and engaged with the engagement recesses and are electrodeposited to a pair of electrodeposition portions provided at both of the power-receiving-side connecting terminals.

2. The electromagnetic fuel injection valve according to claim 1, wherein a pair of guide grooves which connect the pair of electrodeposition portions and the pair of engagement recesses are provided at the terminal boss portion to allow both coil ends pass through the pair of guide grooves.

3. The electromagnetic fuel injection valve according to claim 2, wherein a portion of one end of the guide groove connected to the engagement recess is formed to be smoothly curved.

* * * * *